Oct. 29, 1935.  W. C. HEDGCOCK  2,019,078
TRUCK
Filed Dec. 19, 1931  4 Sheets-Sheet 1
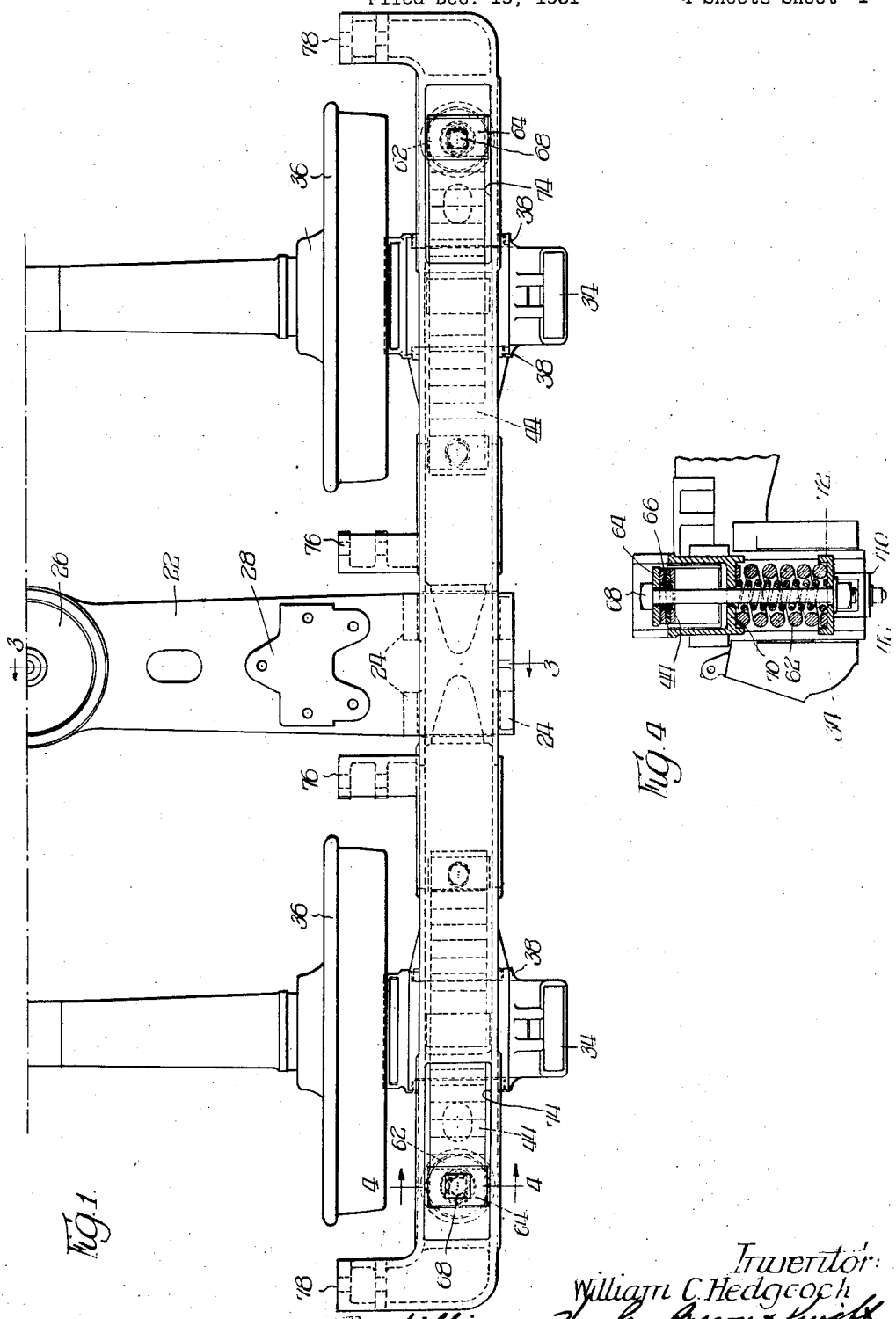

Oct. 29, 1935.   W. C. HEDGCOCK   2,019,078
TRUCK
Filed Dec. 19, 1931   4 Sheets-Sheet 2
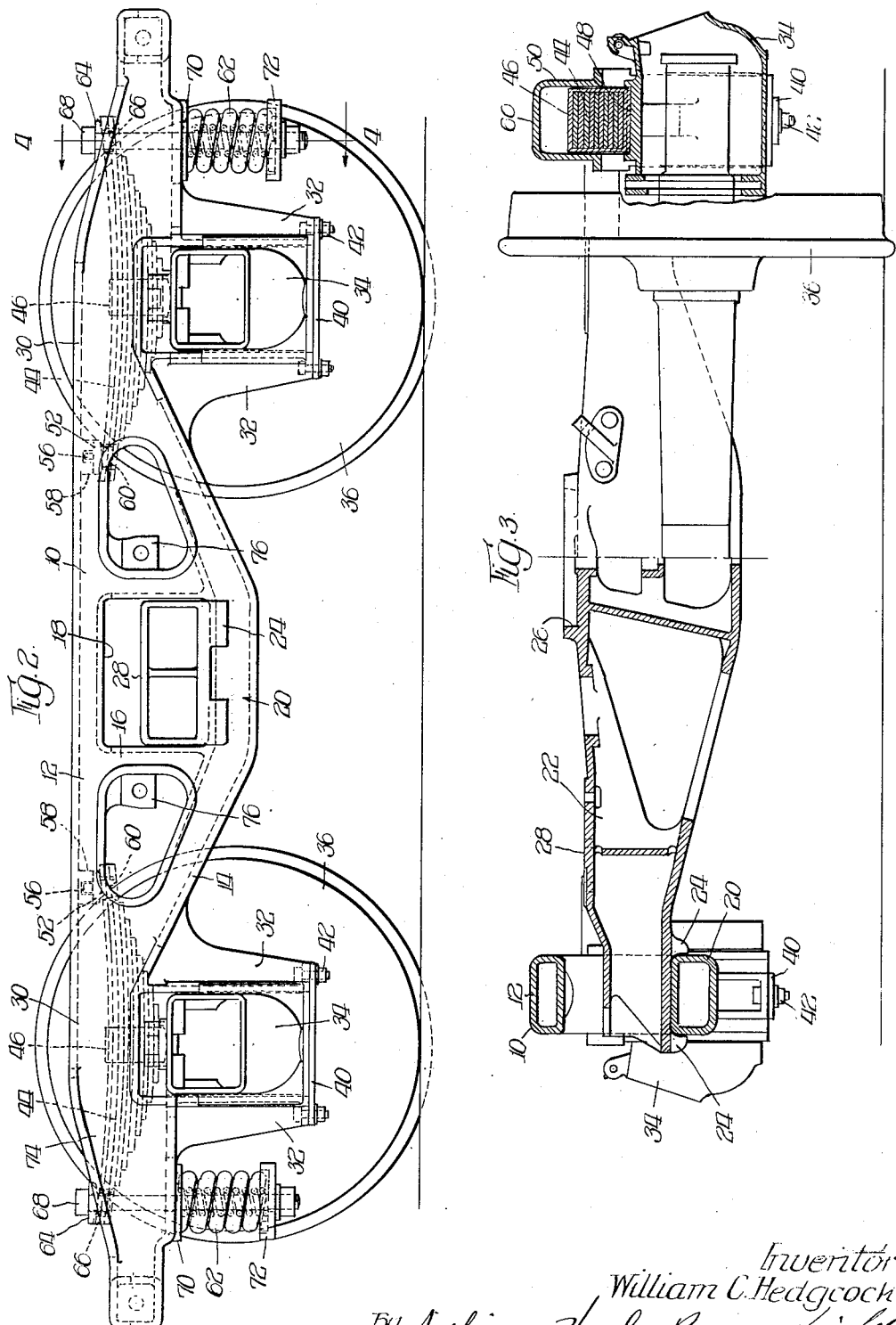
Inventor:
William C. Hedgcock.
By Atkinson, Huxley, Byron & Knight
Attys.

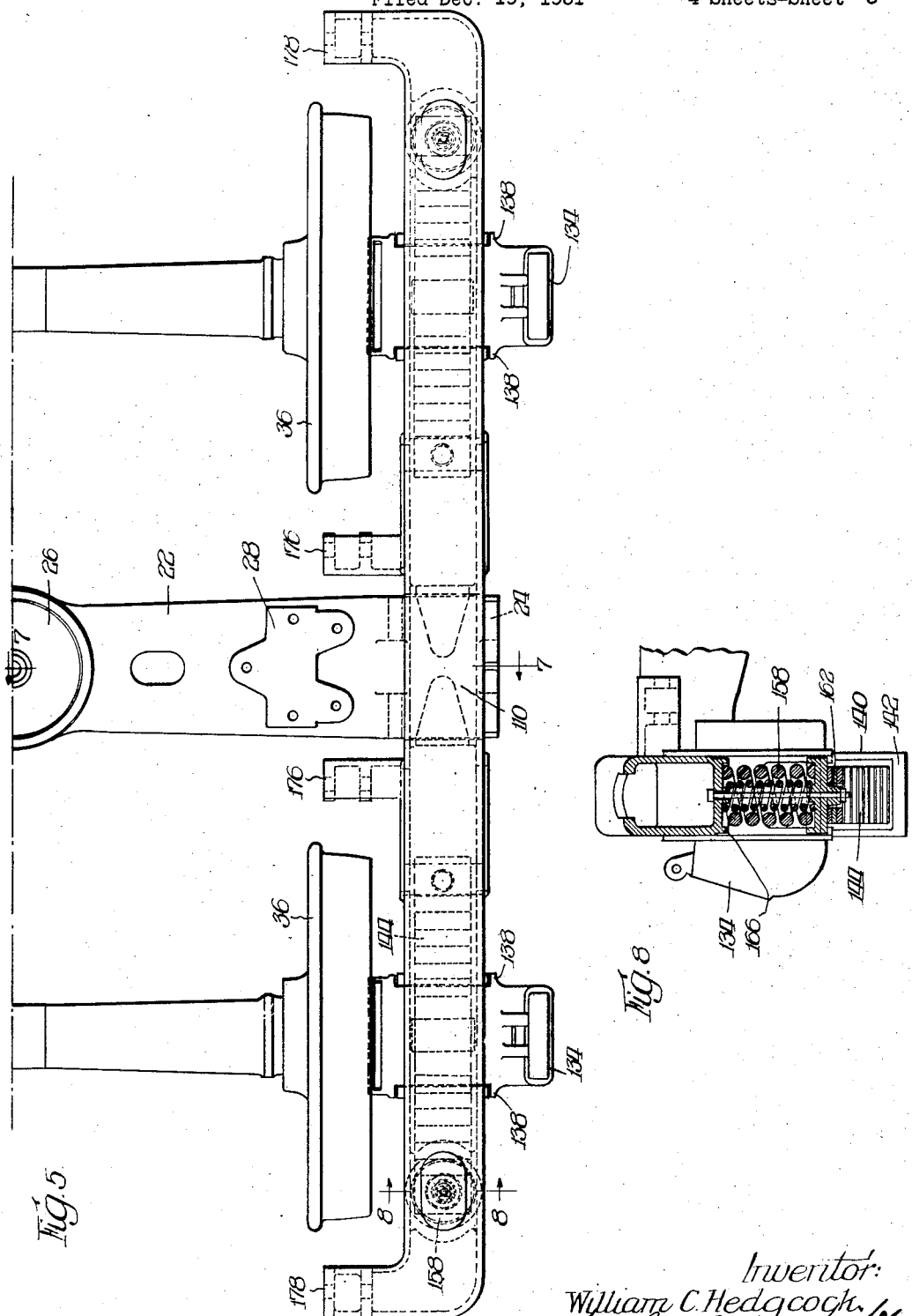

Oct. 29, 1935.  W. C. HEDGCOCK  2,019,078
TRUCK
Filed Dec. 19, 1931  4 Sheets-Sheet 4
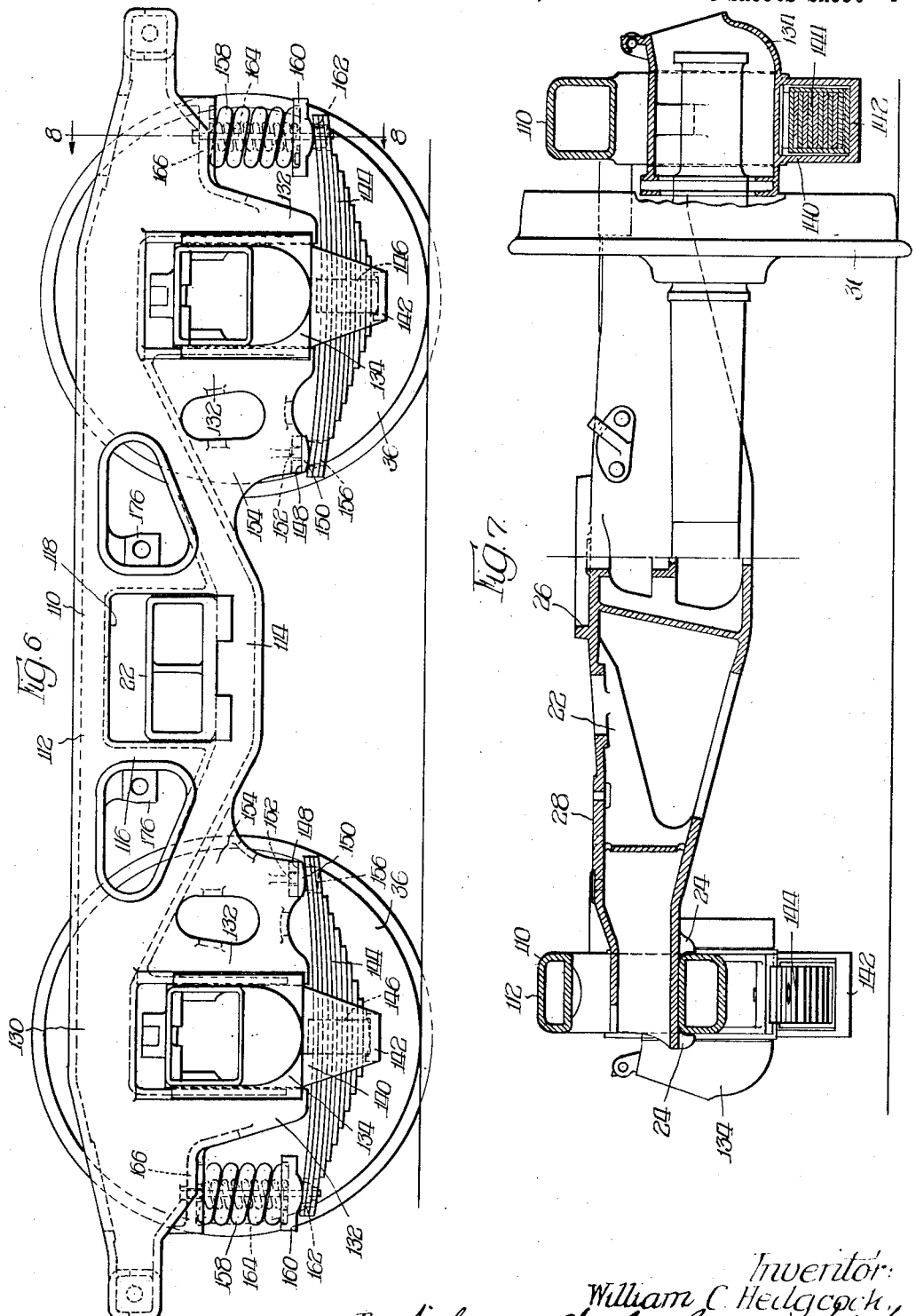
Inventor:
William C. Hedgcock,
By Wilkinson, Higley, Byron & Knight Patented Oct. 29, 1935

2,019,078

UNITED STATES PATENT OFFICE 2,019,078

TRUCK

William C. Hedgcock, Wilmette, Ill., assignor to American Steel Foundries, Chicago, Ill., a corporation of New Jersey Application December 19, 1931, Serial No. 582,061

14 Claims. (Cl. 105—224)

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series; the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to dampen each other's synchronous vibrations without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series.

Yet another object of the invention is to provide a car truck having springs of different characteristics in series and so disposed that complete duplication of carrying capacity is not required in both kinds of springs.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

A yet further object is to provide a truck construction wherein the spring suspension is interposed between the side frame and journal boxes whereby the unsprung weight of the truck parts is reduced to a minimum, and whereby the side frame and parts attached thereto are spring supported. This has the advantage of reducing the impacts and shocks imparted to the side frame, increasing the life and durability of the same, and also avoids the wear and damage to parts, such as brake rigging, supported from the side frame, which might be caused by impact and vibration.

Another further object is to provide a truck construction wherein resilient and friction and/or resilient means are disposed in series.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary top plan view of one form of truck construction embodying the invention;

Figure 2 is a side elevation of the truck construction shown in Figure 1;

Figure 3 is a transverse sectional elevation of the truck construction shown in Figures 1 and 2, the section at the right of the figure being taken through the journal box and side frame in way of the journal box, the section to the left of the figure being taken substantially in the plane as indicated by the line 3—3 of Figure 1;

Figure 4 is a transverse sectional elevation taken substantially in the plane as indicated by the line 4—4 of Figure 1;

Figure 5 is a fragmentary top plan view of a modified form of truck construction;

Figure 6 is a side elevation of the truck construction shown in Figure 5;

Figure 7 is a transverse sectional elevation of the truck construction shown in Figures 5 and 6, the section at the right of the figure being taken through the journal box and side frame in way of said journal box, the section at the left of the figure being taken substantially in the plane as indicated by line 7—7 of Figure 5;

Figure 8 is a transverse sectional elevation taken substantially in the plane indicated by the line 8—8 of Figure 5.

Referring first of all more particularly to the construction shown in Figures 1 to 4 inclusive, the side frame 10 is substantially of truss construction, having the compression member 12, the tension member 14, and the spaced integral connecting columns 16, the columns forming with the tension and compression members the bolster opening 18. The lower arch bar of the tension member between the columns forms a bolster seat for the transverse bolster 22. The bolster extends into the bolster openings of the spaced side frames and is provided with the depending lugs 24 adapted to embrace the lower arch bars for maintaining the spaced frames in squared relation to each other. The bolster is provided with the usual center plate 26 and the side bearings 28, and receives the load from the car body and distributes it to the two side frames.

The tension and compression members merge adjacent their ends as at 30 and are provided with the spaced depending pedestal jaws 32 between which the journal boxes 34 are mounted and guided for vertical movements. The journal boxes are of any desired construction or type, and cooperate with the journal ends of the wheel and axle assemblies 36. The journal boxes are provided with the spaced lugs 38 embracing the pedestal jaws for preventing lateral movements of the journal box while permitting vertical movements thereof. The jaws are connected by means of the retainer plate 40 bolted across the lower ends of the jaws as at 42 for preventing dissociation of the journal boxes from the side frames.

The side frame is resiliently supported on the journal boxes by the semi-elliptic leaf spring assemblies 44, said spring assemblies being supported at a single point as through cooperation between the spring band 46 and the seat 48 formed on the top of the journal box 34, each spring assembly supporting the side frame at spaced points and being disposed longitudinally of the side frame and between the spaced side walls 50 thereof. One of the spaced points of support of the leaf spring for the side frame is provided at the non-resilient seat 52. The seat member 54 of said seat is provided with the upstanding dowel 56 positioned in the socket 58 of the upper web 60 of the side frame and is provided with the depending dowel 60 received in a suitable aperture formed in the inner end of the leaf spring assembly. The opposite or outer spaced point of support of the side frame from the leaf spring assembly is through the coil spring assembly 62.

This coil spring assembly may be of any desired character, such as constant pitch, variable pitch, variable diameter, or variable stiffness, such as disclosed in application Serial No. 552,153, filed July 21, 1931. The coil spring 62 is connected to the leaf spring and to the side frame through the hanger seat 64 mounted on the outer end of the leaf spring, the depending dowel 66 thereof serving as positioning means in the outer aperture of the leaf spring assembly. The hanger rod 68 depends from the seat 64, passing through a suitable aperture formed in the side frame and upper coil spring seat 70 provided on the side frame, and supports the lower coil spring seat 72. The coil spring seat 72, therefore, supports the coil spring 62 which supports the side frame at the seat 70. The leaf spring assembly 44 is then partially enclosed in or embraced by the end section 30 of the side frame, and for means for insertion of the leaf spring the opening 74 is provided in the upper web 60 of the end section adjacent the end of said section.

The side frame is shown with the usual brake hanger brackets 76 disposed between the wheels, and the side frame may be provided with brake hanger brackets 78 at each end of the frame where clasp brakes are used. It is to be understood, of course, that any form of brake rigging may be provided.

Referring now more particularly to the construction shown in Figures 6, 7 and 8, the side frame 110 is substantially of truss construction, having the compression member 112, the tension member 114, and the spaced integral connecting columns 116, the columns forming, with the tension and compression members, the bolster opening 118. The lower arch bar of the tension member between the columns forms a bolster seat for the transverse bolster 22. The bolster extends into the bolster openings of the spaced side frames and is provided with the depending lugs 24 adapted to embrace the lower arch bars for maintaining the spaced frames in squared relation to each other. The bolster is provided with the usual center plate 26 and side bearings 28, and receives the load from the car body and distributes it to two side frames.

The tension and compression members merge adjacent their ends as at 130 and are provided with spaced depending pedestal jaws 132 between which the journal boxes 134 are mounted and guided for vertical movement. The journal boxes are of any desired type and cooperate with the journal ends of the wheel and axle assemblies 36. The journal boxes are provided with the spaced lugs 138 embracing the pedestal jaws for preventing lateral movements of the journal box while permitting vertical movements thereof.

The journal box is provided with a depending stirrup 140 being adapted to receive and embrace the semi-elliptic leaf spring assemblies 144, said spring assemblies being supported at a single point, as through cooperation between the spring band 146 thereof and the seat 142. Each spring assembly 144 supports the side frame at spaced points and is disposed longitudinally of the side frame and substantially in the vertical plane thereof. One of the spaced points of support of the leaf spring is at the non-resilient seat 148. This seat includes the seat member 150 provided with the upstanding dowel 152 received in a suitable seat portion provided in the gusset or bracket portion 154 disposed between the jaws 132 and the tension member 114. The member 150 is also provided with the depending dowel 156 adapted to be received in a suitable aperture formed in the inner end of the leaf spring assembly.

The opposite or outer spaced point of support of the side frame from the leaf spring assembly is through the coil spring assembly 158. As has already been pointed out, this coil spring assembly may be of any desired character. The coil spring assembly is seated upon the spring seat member 160, said member being provided with the depending dowel 162 adapted to be received in an aperture formed in the outer lug of the leaf spring assembly 144. A retaining or hanger bolt 164 is disposed between the seat 160 and the seat portion 166 of the side frame adjacent the outer pedestal 132.

As before, the side frame is shown with the usual brake hanger brackets 176 disposed between the wheels and may also be provided with the brake hanger brackets 178 at each end of the frame where clasp brakes are used. It is to be understood, of course, that any form of brake rigging may be provided.

In operation of each of the constructions shown, the journal boxes are guided longitudinally and laterally on the pedestal jaws, but are permitted vertical motion therein to accommodate the truck to track irregularities and spring motion. The leaf spring transmits part of the load from the side frame to the journal box through the non-resilient connection, and part through the resilient coil spring disposed in series with the leaf spring. The leaf spring and coil spring are preferably so proportioned as to have different characteristics and periods of oscillation whereby they will not have a common synchronous period of oscillation, thus giving a truck construction of easy riding qualities.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a car truck, the combination of a side frame having a tension and compression member and spaced column members forming a bolster opening, a bolster supported in said bolster opening, wheel and axle assemblies, journal boxes cooperating with the journal ends of said wheel and axle assemblies, a leaf spring mounted on each of said journal boxes and having an end disposed on fixed seats provided on said side frame, said spring having another end resiliently supporting said side frame, said bolster being seated on said tension member at substantially axle level and said fixed spring seats being adjacent the compression member of said side frame for the purpose of providing a low center gravity truck.

2. In a car truck, the combination of a side frame having a tension and compression member and spaced column members forming a bolster opening, a bolster supported in said opening, wheel and axle assemblies, journal boxes cooperating with the journal ends of said wheel and axle assemblies, a leaf spring mounted on each of said journal boxes and having an end disposed on fixed seats provided on said side frame, said spring having another end, and a coil spring interposed between said other end of said spring and said side frame, said bolster being seated on said tension member at substantially axle level and said fixed spring seats being adjacent the compression member of said side frame for the purpose of providing a low center gravity truck.

3. In a car truck, the combination of a side frame having a tension and compression member and spaced column members forming a bolster opening, a bolster directly supported in said opening, wheel and axle assemblies, leaf springs mounted in the plane of said side frame and interposed between said wheel and axle assemblies and said side frame, the inner end of said leaf springs non-resiliently engaging fixed seats provided on said side frame, said bolster being seated on said tension member at substantially axle level and said fixed spring seats being adjacent the compression member of said side frame for the purpose of providing a low center gravity truck.

4. In a car truck, the combination of a side frame having a tension and compression member and spaced columns, a bolster directly supported on said side frame between said columns, a journal box, a friction assembly mounted on said journal box, a portion of said friction assembly being resiliently connected to said side frame, another portion of said friction assembly being non-resiliently connected to said side frame through engagement with fixed seats provided on said side frame, said bolster being seated on a portion of said side frame at substantially axle level and the fixed spring seats being adjacent the compression member of said side frame for the purpose of providing a low center gravity truck.

5. In a car truck, the combination of a side frame having a tension and compression member and spaced columns, a bolster directly supported on said side frame between said columns, a journal box, a friction assembly mounted on said journal box and supporting said side frame at a plurality of points, one of said points being a fixed seat on said side frame, said bolster being seated on a portion of said side frame at substantially axle level and said fixed seat being adjacent the compression member of said side frame for the purpose of providing a low center gravity truck.

6. In a car truck, the combination of a side frame having a tension and compression member and spaced columns, a bolster supported on said side frame between said columns, a journal box, a friction assembly mounted on said journal box and supporting said side frame at a plurality of points, and resilient means interposed between said side frame and one of said points of support, another of said points being through a fixed seat on said side frame, said bolster being seated on a portion of said side frame at substantially axle level and said fixed seat being adjacent the compression member of said side frame for the purpose of providing a low center gravity truck.

7. In a car truck, the combination of a side frame having a tension and compression member and spaced columns, a bolster supported on said side frame between said columns, a journal box, a friction assembly mounted on said journal box and supporting said side frame at a plurality of points, and a coil spring interposed between said side frame and one of said points of support, another of said points being through a fixed seat on said side frame, said bolster being seated on a portion of said side frame at substantially axle level and said fixed seat being adjacent the compression member of said side frame for the purpose of providing a low center gravity truck.

8. In a car truck, the combination of a side frame having a tension and a compression member and spaced column members forming a bolster opening, a bolster supported in said bolster opening, wheel and axle assemblies, journal boxes cooperating with the journal ends of said wheel and axle assemblies, a leaf spring mounted on each of said journal boxes and having an end disposed on fixed seats on said side frame, said spring having another end resiliently supporting said side frame through a coil spring, said leaf spring being embraced by the side walls of said side frame, said bolster being seated on a portion of said side frame at substantially axle level and the fixed spring seats being adjacent the compression member of said side frame for the purpose of providing a low center gravity truck.

9. In a car truck, the combination of a side frame having a tension and a compression member and spaced column members forming a bolster opening, a bolster supported in said bolster opening, wheel and axle assemblies, journal boxes cooperating with the journal ends of said wheel and axle assemblies, said journal boxes each having a seated stirrup, a leaf spring mounted on the seat in each said stirrup and having one end disposed in supporting relation to said side frame, said spring having another end supporting said side frame through a coil spring.

10. In a car truck, the combination of a side frame having a tension and a compression member and spaced column members forming a bolster opening, a bolster supported in said bolster opening, wheel and axle assemblies, journal boxes cooperating with the journal ends of said wheel and axle assemblies, said journal boxes each having a seated stirrup disposed below said boxes and frame, a semi-elliptic leaf spring mounted on the seat in each said stirrup and having one end disposed in supporting relation to said side frame, said spring having another end supporting said side frame through a coil spring.

11. In a truck, the combination of a side frame having a tension and a compression member and spaced columns, a bolster disposed between said columns, a wheel and axle assembly, a journal box for receiving the journal end of said wheel and axle assembly, said journal box being movably associated with said side frame, a spring interposed between said journal box and side frame and engaging a fixed seat on said side frame on one side of said journal box, and a coil spring interposed between the other end of said spring and said side frame outwardly of said journal box, said bolster being seated on a portion of said side frame at substantially axle level and said fixed seat being adjacent the compression member of said side frame for the purpose of providing a low center gravity truck.

12. In a truck, the combination of a side frame having a tension and a compression member and spaced columns, a bolster disposed between said columns, a wheel and axle assembly, a journal box for receiving the journal end of said wheel and axle assembly, said journal box being movably associated with said side frame, a leaf spring interposed between said journal box and side frame and engaging said journal box intermediate the ends of said spring, the inner end of said spring engaging a fixed seat on the side frame, the outer end of said spring being resiliently mounted on said side frame, said bolster being seated on a portion of said side frame at substantially axle level and said fixed seat being adjacent the compression member of said side frame for the purpose of providing a low center gravity truck.

13. In a truck, the combination of a side frame having a tension and a compression member and spaced columns, a bolster disposed between said columns, a wheel and axle assembly, a journal box for receiving the journal end of said wheel and axle assembly, said journal box being movably associated with said side frame, a leaf spring interposed between said journal box and side frame and disposed above said journal box, one end of said leaf spring engaging a fixed seat on said side frame, the other end of said leaf spring being resiliently connected to said side frame through a coil spring disposed below said other spring, said bolster being seated on a portion of said side frame at substantially axle level and said fixed seat being adjacent the compression member of said side frame for the purpose of providing a low center gravity truck.

14. In a truck, the combination of a side frame, a wheel and axle assembly, a journal box for receiving the journal end of said wheel and axle assembly, said journal box being movably associated with said side frame, a leaf spring interposed between said journal box and side frame and disposed below said journal box, one end of said leaf spring engaging said side frame, the other end of said leaf spring being resiliently connected to said side frame through a coil spring disposed above said leaf spring.

WILLIAM C. HEDGCOCK.